United States Patent
Applegarth

(10) Patent No.: US 6,299,670 B1
(45) Date of Patent: Oct. 9, 2001

(54) INTEGRATED HEATED GETTER PURIFIER SYSTEM

(75) Inventor: Charles H. Applegarth, San Luis Obispo, CA (US)

(73) Assignee: SAES Pure Gas, Inc., San Luis Obispo, CA (US)

(*) Notice: Subject to any disclaimer, the term of this patent is extended or adjusted under 35 U.S.C. 154(b) by 0 days.

(21) Appl. No.: 09/330,316

(22) Filed: Jun. 10, 1999

(51) Int. Cl.[7] .................................................. B01D 53/04
(52) U.S. Cl. .............................. 95/114; 95/117; 95/126; 95/143; 96/135; 96/137; 96/139; 96/149; 96/152
(58) Field of Search .................................... 95/14, 17, 18, 95/114, 115, 117, 126, 138, 130, 139, 140, 143; 96/108, 112, 134–141, 146, 149, 152, 130

(56) References Cited

U.S. PATENT DOCUMENTS

| | | | |
|---|---|---|---|
| 3,200,569 | * 8/1965 | Wheeler | 96/146 |
| 3,224,168 | * 12/1965 | Gregory | 96/146 |
| 3,353,339 | * 11/1967 | Walter | 96/137 |
| 3,464,186 | * 9/1969 | Hankison et al. | 96/137 X |
| 3,981,699 | 9/1976 | Molitor | 55/208 |

(List continued on next page.)

FOREIGN PATENT DOCUMENTS

| | | |
|---|---|---|
| 57156308 | 9/1982 | (JP) . |
| 57156314 | 9/1982 | (JP) . |
| 62212208 | 9/1987 | (JP) . |
| 63064901 | 3/1988 | (JP) . |
| 04149010 | 5/1992 | (JP) . |
| 04209710 | 7/1992 | (JP) . |
| 10245209 | 9/1998 | (JP) . |
| WO 95/05885 | 3/1995 | (WO) . |

OTHER PUBLICATIONS

Web site; www.insyncsys.com; *The World Leader in Outsource Gas Systems Technology;* 1998.

Non–English Publication; Vysokochistye Veshchestva; 1990, vol. 1, pp. 122–127.

A. P. Eremeev, P. F. Vesekivskii; Thermogravimetric Feasibility Study Of Argon Purification Using Powders Of Titanium Alloys With Molybdenum And Vanadium; Plenum Publishing Corporation, 1987.

Background Statement for the Vote to Technically Correct Unpublished PR3 Specification for Surface Mount Interface of Gas Distribution Components; SEMI Draft Doc. 2787.

Surya Parkash, P. Vijendran; Sorption of active gases by non–evaporable getter; Vacuum, vol. 33, No. 5, pp. 295–299, 1983.

(List continued on next page.)

*Primary Examiner*—Robert H. Spitzer
(74) *Attorney, Agent, or Firm*—Oppenheimer, Wolff & Donnelly, LLP

(57) ABSTRACT

The present invention provides a method and apparatus to purify various gases utilizing the superior performance a heated getter process in a smaller package than previous multiple stage, heated getter processes. The smaller package includes inner and outer enclosures, and an integral, regenerative heat exchanger to simultaneously increase heater efficiency and cool the purified gas. The invention also includes a particle filter to remove particles from the gas flow. The invention further provides an interface to various modular gas stick substrate designs with an inlet and an outlet in one end of the integrated heated getter purifier system. The inlet gas is preheated by the integral heat exchanger and then heated to operating temperature of 200–400° C. The heated getter removes various impurities from the gas. The heated gas is then cooled in the integral heat exchanger. The cooled gas is exposed to a second quantity of cooler getter to remove residual impurities. The gas is then, preferably, filtered to remove particles before releasing to be utilized in semiconductor processing and integrated circuit device manufacturing and other industries.

26 Claims, 9 Drawing Sheets

U.S. PATENT DOCUMENTS

| | | | |
|---|---|---|---|
| 4,029,486 | * | 6/1977 | Frantz .................................... 96/137 |
| 4,113,451 | * | 9/1978 | Frantz .................................... 96/112 |
| 4,131,442 | * | 12/1978 | Frantz .................................... 96/137 |
| 4,199,331 | * | 4/1980 | Frantz ................................ 96/130 X |
| 4,544,384 | * | 10/1985 | Metschl et al. ........................ 96/130 |
| 4,544,385 | * | 10/1985 | Tanaka ............................... 96/146 X |
| 5,194,233 | | 3/1993 | Kitahara et al. ..................... 423/210 |
| 5,238,469 | | 8/1993 | Briesacher et al. .................... 95/115 |
| 5,294,422 | | 3/1994 | Kitahara et al. .................. 423/245.1 |
| 5,669,961 | | 9/1997 | Baker et al. ........................... 95/115 |
| 5,689,893 | * | 11/1997 | Mitsch ............................... 96/137 X |
| 5,833,738 | | 11/1998 | Carrea et al. .......................... 95/115 |

OTHER PUBLICATIONS

T. V. Adamiya, G. Yu. Sabenina, E. A. Myagkov, B. P. Okhotnikov; Removal of Permanent Gases from Helium on Porous Titanium by Using a Temperature Gradient in the Layer; Plenum Publishing Corporation, 1987.

Joseph B. Milstein, Lionel F. Saunders; Gettering of Gases for High Purity Applications; Journal of Crystal Growth 89, 1988.

* cited by examiner

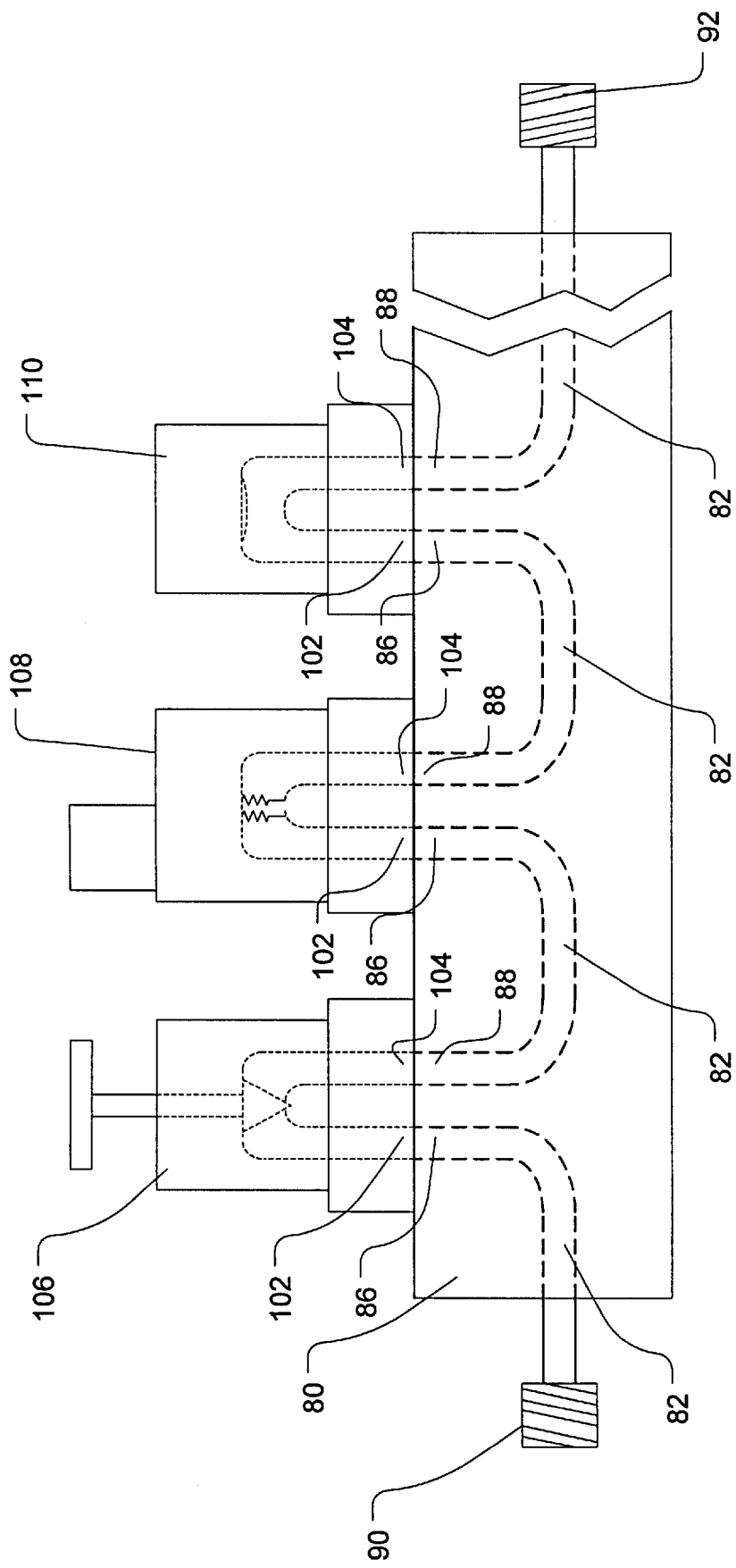

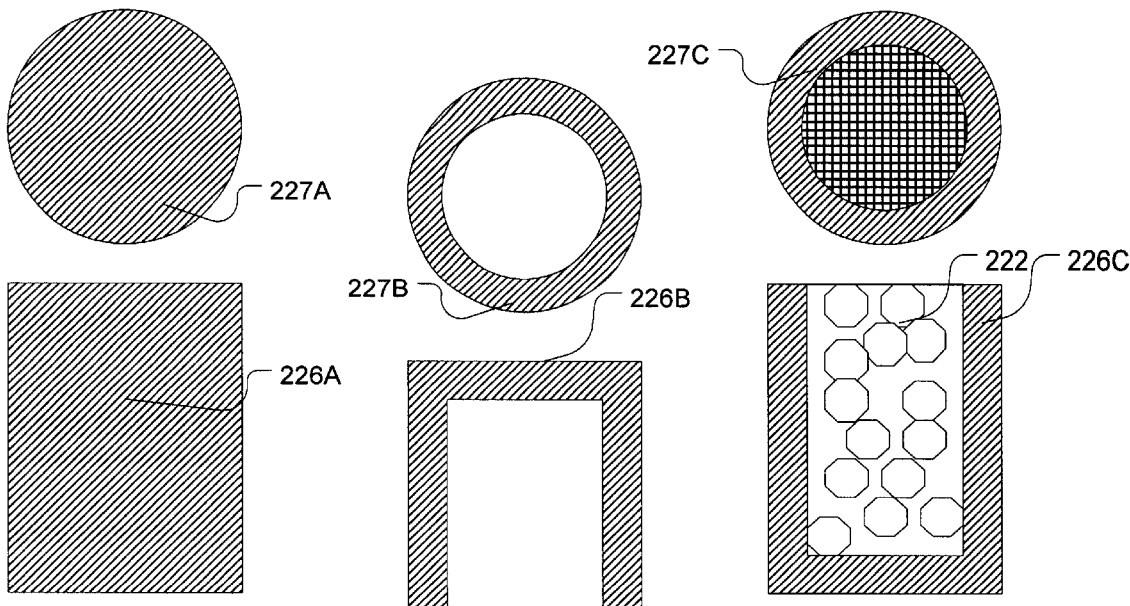
FIGURE 7A     FIGURE 7B     FIGURE 7C
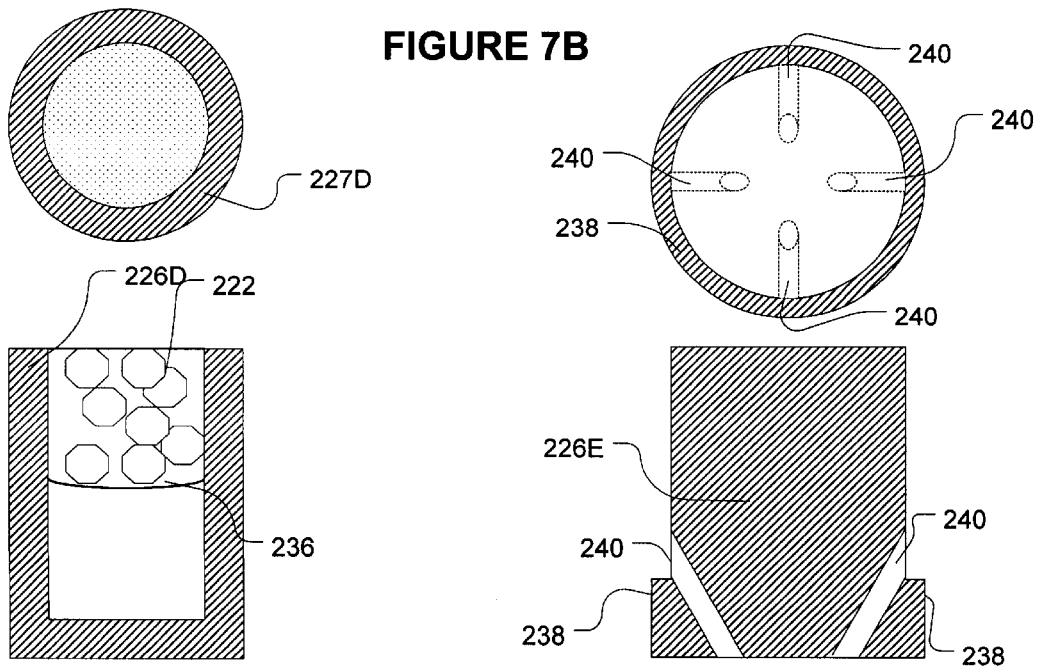
FIGURE 7D     FIGURE 7E

INTEGRATED HEATED GETTER PURIFIER SYSTEM

TECHNICAL FIELD

The present invention is related to gas purification and more specifically, to getter based methods and apparatus for removing impurities from gases.

BACKGROUND ART

Ultra-high purity (UHP) gases are preferred for the manufacture of semiconductor devices, laboratory research, mass spectrometer instruments and other industries and applications. UHP gases are typically defined as at least 99.9999999% pure gas by volume.

There are several methods of producing UHP gases. The method used is generally determined by the desired flow rate of gas. Small flow rates of UHP gas are most typically utilized in a single point of use (POU) such as a single laboratory test station or a single process tool such as a chemical vapor deposition (CVD) semiconductor processing tool. For POU applications and other similar, small flow rate applications, the preferred methods are either a cold reactive purification process, or a heated getter purifier process, primarily due to the small scale production possible with these methods.

A cold reactive purification process typically utilizes a reactive metal, metal alloy or polymer resin based purification material. The cold reactive purification process exposes a specific, reactive purification material to an impure gas to be purified. Typically, this method requires, specially conditioned purification material to "activate" the purification material, and then forcing the impure gas through the purification material under pressure. The purification material chemically or physically bonds with the impurities in the impure gas such that purified gas flows out of the enclosure.

FIG. 1 is a flow chart illustrating a prior art cold reactive purification process 10 utilizing porous, reduced nickel catalyst pellets as the purification material. First in an operation 14, an impure gas, such as argon, containing trace impurities of oxygen, is caused to flow through the porous nickel pellets under pressure. The trace oxygen impurities react with the nickel metal to form nickel oxide. Other impurities can also react with the nickel. The purified gas is then used for the intended purpose (e.g. a semiconductor fabrication process) in an operation 16. When the nickel has been substantially oxidized by the process 10 then oxygen and other impurities will no longer be effectively removed from the gas.

The cold reactive purification material is described as having reached "purification capacity" when the cold reactive purification material has reacted with the impurities to a point wherein the purification material can no longer remove the impurities from the impure gas to the required performance level. Using the above example of nickel, the nickel has reached purification capacity when the nickel can no longer remove the trace oxygen from the impure gas such that the resulting gas is no longer at least 99.999999% pure. When the cold reactive purification material has reached purification capacity for a given impurity, the purification material must be replaced or, if possible, reactivated.

The "total capacity" of an impurity is the amount of impurity required wherein substantially all of the purification material has been consumed or otherwise reacted by the impurity and therefore the purification material can no longer react with any impurities.

The total capacity for a given impurity is typically much greater than the purification capacity. Increased purification capacity for impurities is typically obtained by utilizing a larger volume of purification material.

Cold reactive purification material processes have the advantage of being very simple to operate in that they are typically "activated" at the factory and operate in the field without requiring a control or monitoring system. Cold reactive purification processes have the disadvantage of being capable of only removing a very limited number of types of impurities and then only having a small capacity for the limited number of types of impurities. Cold reactive purification process purifiers have been known to overheat and even cause fires if exposed to too great of a concentration of impurities at one time.

Heated getter purification materials, hereafter referred to as getter, are typically alloys and mixtures of Zr, Ti, Nb, Ta, V and other materials. A heated getter process is one where an impure gas to be purified is exposed to a quantity of getter material maintained at an appropriate temperature.

FIG. 2 illustrates a prior art heated getter process 30. In operation 31, the impure gas flows in the inlet in a first end of the purifier. Then, in an operation 32, the impure gas is preheated to operating temperature. Next, in an operation 34, the heated getter chemically bonds with impurities such as $CO_2$, $H_2O$, $CH_4$, CO, $O_2$, $N_2$, and other impurities in the impure gas. In an operation 36, the purified gas is cooled to near ambient temperatures in a heat exchanger process. At near ambient temperatures, getters have a large capacity for $H_2$. An optional operation 38 substantially removes residual $H_2$, and other impurities, utilizing a quantity of near ambient temperature getter. In an operation 39, the purified gas flows out the outlet in the second end of the purifier. The purified gas is then used for the intended purpose (e.g. a semiconductor fabrication process) in an operation 40.

A getter has reached purification capacity when the getter can no longer remove impurities to the required performance level. When a getter material has reached purification capacity for a given impurity, the getter must be replaced.

The total capacity of an impurity is the amount of impurity required wherein substantially all of the getter has been consumed or otherwise reacted by the impurity. The total capacity for a given impurity is typically much greater than the purification capacity for that impurity. Increased purification capacity for impurities is typically obtained by utilizing an increased volume of getter or heating the getter to a higher temperature.

A heated getter process has the advantage over the cold reactive purification material process of removing as much as fifty times the quantity of a given impurity for an equivalent quantity of purification material. The heated getter process also removes several types of impurities where the cold reactive purification material process typically removes only one or two types of impurities. This reduces the overall operation and maintenance cost of these systems.

Disadvantages of the heated getter process include: increased cost of the purification material alloy; requirement of a heat source which then requires a method of controlling the heat source such as a control system; and a requirement to cool the purified gas after purification. There also exists a potential of danger for personnel around heated getter purifiers since they typically operate at 300° C. or higher and personnel can be burned on contact. Heated getter purifiers have also been known to cause fires if, while at operating temperature, the heated getter is exposed to too great of a concentration of impurities at one time. Due to the requirements of a heat source, a control system and gas cooling system, heated getter purifiers are typically built for medium and larger scale applications.

Most POU applications require small scale control and monitoring in addition to purification. These control, monitoring and purification assemblies are known as a "gas stick." FIG. 3 is a schematic diagram of a typical prior art gas stick 50. The gas stick 50 includes a pressure regulator 52 to control gas pressure, an inlet valve 54 to control inlet gas flow, a heated getter purifier 56 to purify the gas, a purifier outlet isolation valve 58 to isolate the purifier, a mass flow controller or mass flowmeter 60 to control or monitor the gas flowrate, a check valve 62 to control reverse gas flow, a pressure transducer or pressure gauge 64 to monitor system pressure, and an outlet filter 66 to remove particles from the gas flow.

Gas sticks are typically assembled utilizing two sealing methods or combinations thereof. Metal to metal sealing surfaces with crushable seals 68 are typically utilized for components which are replaceable. Welded connections 70 are typically utilized for components not typically replaceable. Both assembly methods are expensive and difficult to properly utilize.

The gas sticks grow more complicated as purification, control and instrumentation requirements increase. More complicated gas sticks become larger and more difficult to use in the limited space in a typical POU. Recently, gas sticks have evolved to include gas mixing, gas purging, and gas source selection in addition to the previous functions and components listed above.

The increased size and complexity of gas sticks has driven the development of a modular gas stick. An example of a modular gas stick specification can be found in the Specification For Surface Mount Interface of Gas Distribution Components, SEMI draft doc. #2787, 1998, incorporated herein by reference.

The specification for Surface Mount Interface (SMI) defines a modular interface to gas stick type components. FIG. 4A illustrates an example of a modular gas stick substrate 80 and FIG. 4B illustrates a modular gas stick component base 100. The modular gas stick substrate 80 includes machined passages 82 for gas flow, for example, from a component station 84 to component station 94. Each component station 84, 94, 95, 96, 97, 98 and 99 includes an inlet port 86 and an outlet port 88 which corresponds to inlet port 102 and outlet port 104 in each modular gas stick component base 100. A plurality of component types such as valves, mass flowmeters, and pressure transducers may be manufactured with a modular gas stick base 100. Each modular gas stick component base 100 seals to a common modular gas stick substrate 80. Modular gas stick substrates 80 may be utilized in a single or a multiple gas passage 82 design.

FIG. 5 illustrates several typical components installed on a modular gas stick substrate 80, namely, a first component 106, a second component 108, and a third component 110. Gas flows into an inlet 90 of the modular gas stick substrate 80, through a passage 82 in the modular gas stick substrate 80 to a first component station 84, through inlet port 86 in substrate 80, through an inlet 102 of the first component 106 through the first component 106 to an outlet 104, through an outlet port 88 of substrate 80. From the first component 106, gas flows into passage 82 in the modular gas stick substrate 80, to a second component 108. The flow continues from component station to component station until the gas reaches an outlet 92 of the modular gas stick substrate 80.

The modular gas sticks offer two important advantages over traditional gas sticks: First, a modular gas stick assembly and maintenance is faster, simpler and easier. Second, a modular gas stick is very compact in size. Modular gas sticks are more compact by following strict size and shape limitations on all components. As an example, SMI specifies the size of components other than valves and MFC/MFM, such as purifiers, to be confined to an envelope defined as a base 38.15 mm in width, 38.15 mm in depth, and a height of 180 mm.

The simple, ambient temperature operation of the cold reactive purification material process is utilized and works well in modular gas stick applications. However, heated getter processes have not been used with modular gas sticks. This is due, in part, to temperature limitations of the gas stick substrates which typically require temperatures of 40° C. or lower. Many heated getter purifiers heat the getter material to temperatures between 200° C. and 400° C., and as such, would be incompatible with modular gas sticks implementation. Furthermore, heated getter purification is generally considered a larger, less compact scale application than those associated with modular gas stick systems.

DISCLOSURE OF THE INVENTION

The present invention provides a method and apparatus to purify various gases utilizing a heated getter process in a smaller package than previous heated getter processes. The smaller package ("form factor") also includes an integral, regenerative heat exchanger to simultaneously increase heater efficiency and cool the purified gas. The cooled gas is exposed to a second quantity of cooler getter to remove residual impurities and is then preferably filtered to remove particles before releasing. A preferred embodiment of the invention further provides an interface to various modular gas stick substrate designs.

A method for purifying gas to remove multiple impurities from an impure gas includes heating the impure gas in a regenerative heat exchanger, and then heating to operating temperature by a heater. The heated impure gas is then exposed to a heated getter material and is then cooled in the regenerative heat exchanger. The cooled resulting gas is then exposed to cooler getter to remove residual impurities. The purified gas is then filtered utilizing an UHP performance particle filter.

An apparatus for purifying gas includes an outer enclosure and an inner enclosure. A first end is connected to both inner and outer enclosures and a second end is connected to the outer enclosure. An annular volume is defined between the outer enclosure and the inner enclosure and an inner volume is defined by the inner enclosure.

The first end also includes an inlet and an outlet. The inlet is connected to the annular volume and the outlet is connected to the inner volume. A quantity of heated getter is located in the inner volume. Preferably, a diverter, a second quantity of getter and a filter are also located in the inner volume. The diverter separates the heated getter from the second quantity of cooler getter and the filter separates the contents of the inner volume from the outlet.

The present invention provides the superior heated getter purification performance in a small, compact form factor. Through efficient design, a heat exchange is performed between in-flowing and out-flowing gases, reducing energy consumption for the purifier and cooling the purified gas. The integral heat exchange also provides the opportunity for cooler getter to remove residual impurities from the out-flowing gas. These factors allow the use of the heated getter purifier with modular gas stick systems and other compact, temperature sensitive applications.

These and other advantages of the present invention will become apparent to those skilled in the art upon reading the following detailed descriptions and studying the various figures and drawings.

BRIEF DESCRIPTION OF THE DRAWINGS

FIG. 5 illustrates a prior art modular gas stick interface system with a number of attached components.

FIGS. 7A–7E illustrate various alternative diverter designs of the diverter 226 of FIG. 6.

BEST MODES FOR CARRYING OUT THE INVENTION

FIGS. 1 through 5 were discussed with reference to the prior art.

Figure 1:
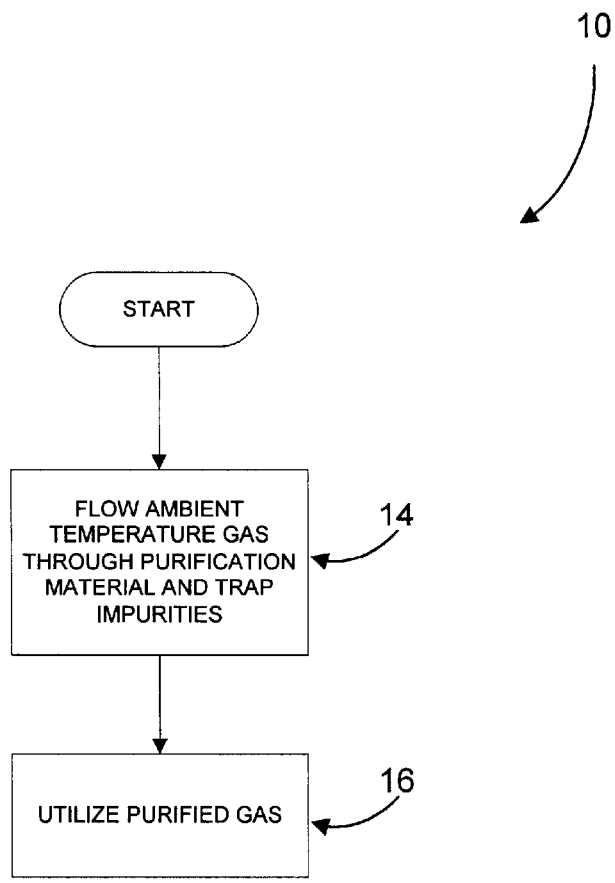
FIG. 1 is a process flowchart illustrating a cold reactive purification material process of the prior art.
Figure 2:
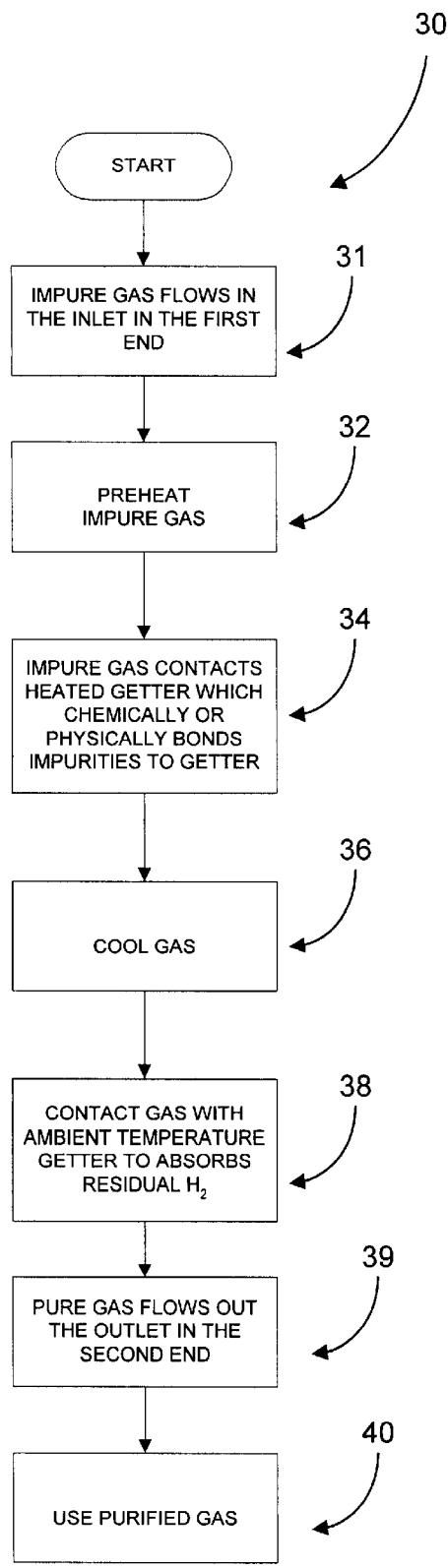
FIG. 2 is a process flowchart illustrating a heated getter purification process of the prior art.
Figure 3:
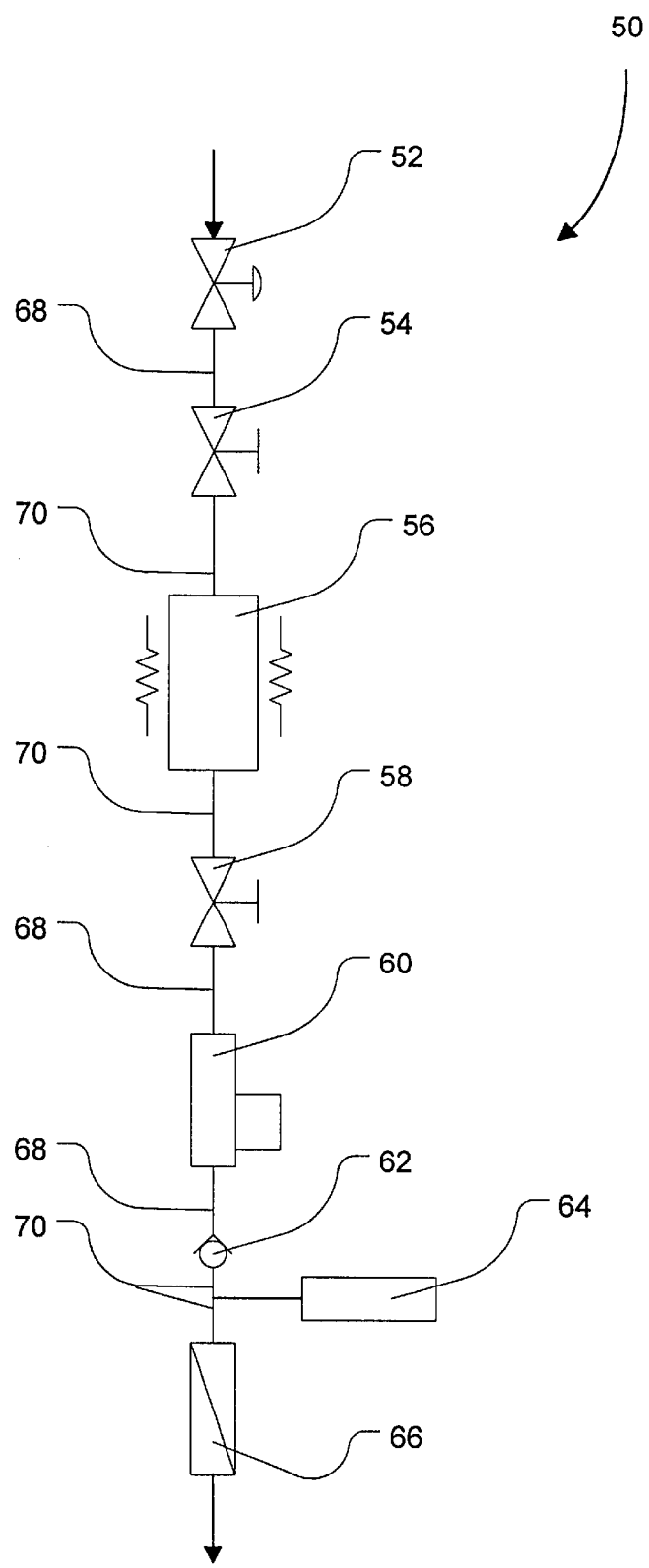
FIG. 3 is a schematic of a typical, prior art gas stick.
Figure 4B:
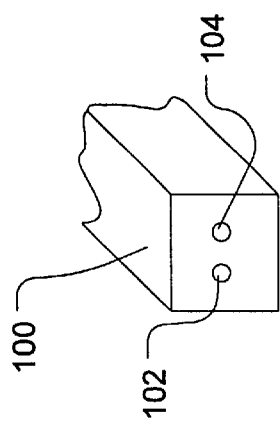
FIG. 4B illustrates a prior art modular gas stick interface.
Figure 4A:
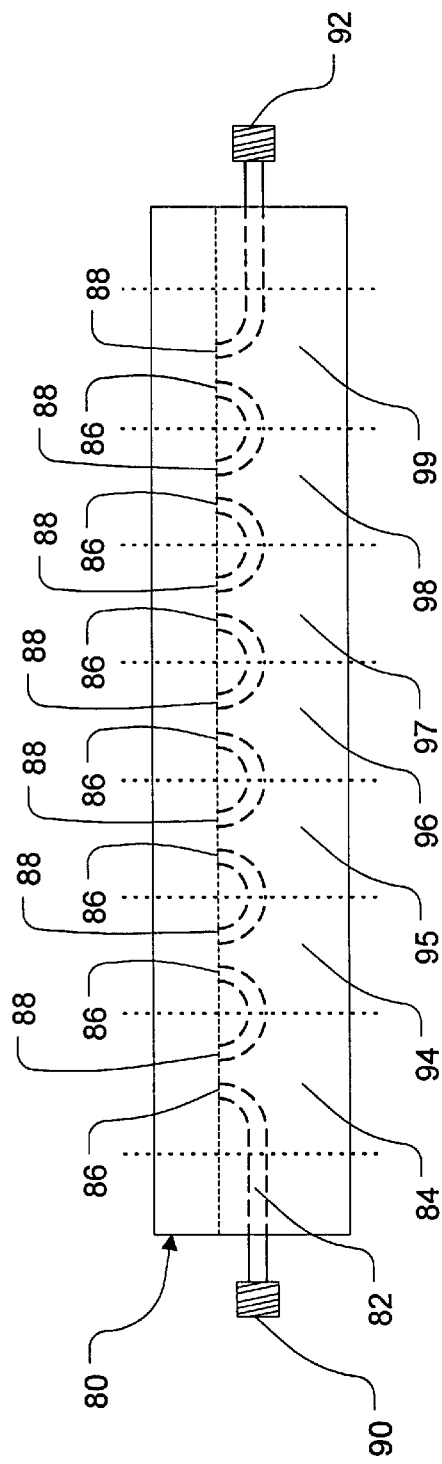
FIG. 4A illustrates a prior art modular gas stick substrate.
Figure 6:
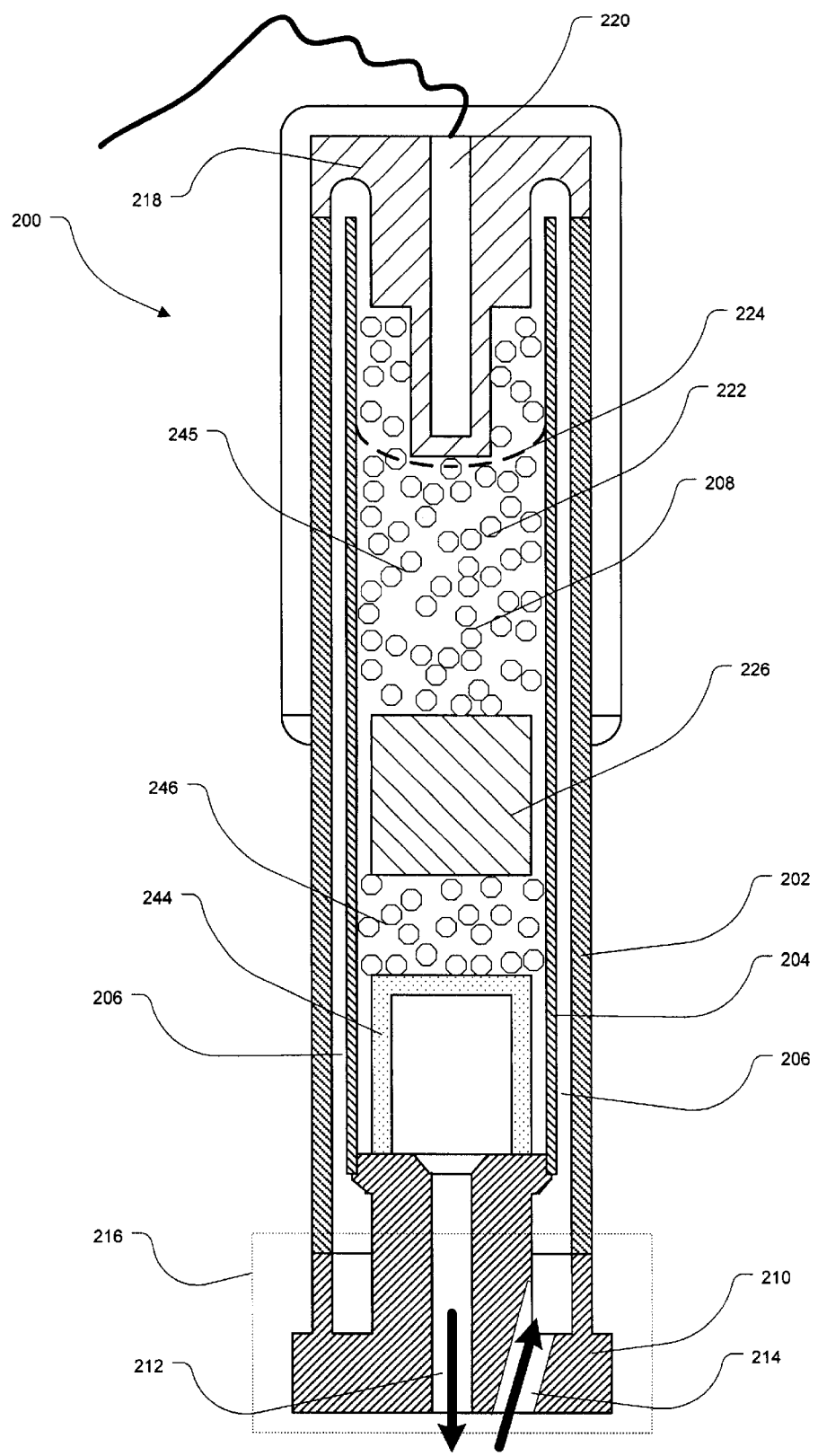
FIG. 6 is a cross-section of a heated getter purifier system of the present invention.

FIG. 6 illustrates an integrated heated getter purifier system 200 as an embodiment of the present invention. The integrated heated getter purifier system 200 includes an outer enclosure 202. The outer enclosure 202 may be a cylinder or any other cross-sectional shape such as a rectangle, square, triangle or any other polygon shape. Other shapes may also be utilized. The outer enclosure 202 illustrated in the first embodiment is preferably manufactured from 316L or 304L low carbon stainless steel (SST). Other materials such as other grades of steel and other metals can also be utilized. The expected design pressure is 150 pounds per square inch (psi) or higher. The outer enclosure 202 wall should be at least 0.016 inch to withstand the expected design pressure. The outer enclosure 202 wall may also be as thick as desired. The outer enclosure 202 wall provides the structural strength of the heated getter purifier assembly and also provides some thermal insulation. In this embodiment, the outer enclosure 202 is preferably manufactured from a standard 1.5 inch diameter SST tube. Such tubing is typically 0.065 inch thick. For the above cited factors, 0.065 inch wall is typically chosen as the simplest choice but other thicknesses may also be utilized.

Surface finishing is typically stated in terms of a roughness average (Ra), where the roughness average rating is an arithmetic average of the absolute values of the measured profile height deviations taken within a sampling length and measured from a graphical centerline. The surface finish of the outer enclosure 202 wall is preferably such that substantially all manufacturing oil and films have been removed. Typically the outer enclosure 202 is electropolished to a 10 $\mu$in Ra finish for cleaning and cosmetic purposes. Electropolishing is not required for the outer enclosure 202.

The first embodiment of an integrated heated getter purifier system 200 also includes an inner enclosure 204. The inner enclosure 204 may be any cross-sectional shape corresponding to the outer enclosure 202. The inner enclosure 204 is disposed within the outer enclosure such that an annular volume 206 is defined by the two enclosures. The inner enclosure 204 also defines an inner volume 208. The inner enclosure 204 in the first embodiment is preferably manufactured from 316L or 304L low carbon SST. Other materials such as other grades of steel and other metals can also be utilized.

The inner enclosure 204 in the first embodiment, is preferably approximately 0.010 inches thick so as to more readily transfer heat from the inner volume 208 through the inner enclosure 204 wall to the annular volume 206. The thickness of the inner enclosure 204 wall can also be thicker or thinner. The inner enclosure 204 wall thickness is determined by the following heat transfer relationship:

$$Watt = (KA\Delta T)/L$$

where:

Watt=the heat in watts transferred through the material

K=heat transfer constant for the inner enclosure 204 material type

A=area exposed to heat in this case the inner enclosure 204 wall area $\Delta T = T1 - T2$ T1=temperature of hotter, inner surface of the inner enclosure 204 wall T2=temperature of cooler, outer surface of the inner enclosure 204 wall L=thickness of inner enclosure 204 wall Since K and A are constants and a very high $\Delta T$ is desired, then heat transferred through the inner enclosure 204 wall will increase as L decreases. As will be further described below, the inner enclosure 204 wall thickness is optimized to transfer heat as quickly and efficiently as possible.

The surface finish of the inner enclosure 204 wall must be such that substantially all manufacturing oil and films have been removed. Preferably, the inner enclosure 204 is electropolished to a 5–10 $\mu$in Ra finish for particle and purity performance.

The integrated heated getter purifier system 200 illustrated in FIG. 6 further includes a first end portion 210. The first end portion 210 is preferably manufactured from 316L or 304L SST. Other materials such as other grades of steel and other metals can also be utilized. The first end portion 210 may be welded to the inner enclosure 204 and outer enclosure 202. Such welding is typically hetogenous welding wherein the pieces are fused together, using an electronic arc welder, without any filler material. Other welding methods may also be applied. The first end portion 210 is electropolished to achieve a 10 $\mu$in Ra or better surface finish. Methods other than electropolishing may be utilized but the outlet 212 and the surface of the first end 210 which is exposed to the inner volume 208 should be a 10 $\mu$in Ra or better surface finish. This surface finish requirement is required to maintain UHP performance downstream of the purification material. The first end portion 210 also includes an inlet 214 passage such that the inlet 214 communicates with the annular volume 206.

The first end portion 210 forms the modular gas stick interface 216 to communicate to a modular gas stick substrate. There are several designs of the modular gas stick substrates in the market place. The first end portion 210 can be designed in a plurality of shapes such that the shape communicates with a specific gas stick substrate. In each form, the outlet 212 and the inlet 214 may be in any location or orientation required by the specific modular gas stick substrate desired.

The integrated heated getter purifier system illustrated in FIG. 6 further includes a second end 218. In the first embodiment, the second end portion 218 is preferably manufactured from 316L or 304L SST. Other materials such as other grades of steel and other metals can also be utilized. The second end portion 218 may be welded to the outer enclosure 202 but is not contacted to the inner enclosure 204. The second end portion 218 may also be welded or otherwise contacted to the inner enclosure 204. The preferred embodiment provides a small space, for gas flow, between the second end 218 and the inner enclosure 204. If the second end portion 218 contacts the inner enclosure 204, access for gas flow from the annular volume 206 to the inner volume 208 must be provided. The welding is typically hetogenous welding wherein the pieces are fused together, using an electronic arc welder, without any filler material. Other welding methods may also be applied. The surface finish of the second end portion 218 should be such that substantially all manufacturing oil and films have been removed. Typically, the second end portion 218 is electropolished to a 10 μin Ra finish for particle and purity performance. Electro-polishing is not required for the second end portion 218, other cleaning methods may be utilized.

The second end portion 218 also provides a location for a heater 220. The facility for the heater 220 is typically a "well" which is a slot or hole provided in the second end portion 218. The well does not fully penetrate the second end portion 218. The heater 220 in this embodiment is a cylindrically shaped, resistive, electrical heater available from a variety of sources such as Watlow Inc of St. Louis, Mo. Other types of heaters such as a coil heater, a band type heater, a blanket type heater or other types of heaters around the outside or inside the second end portion 218 can also be utilized. The heater 220 may also have an integral temperature sensor or thermocouple. The thermocouple can be utilized by an external controller described below. The heater 220 can also have an internal temperature control switch. The temperature control switch would provide internal temperature regulation of the heater 220.

The inner volume 208 contains a quantity of purification material 222. The purification material in the preferred embodiment is a getter material 222. Other purification materials such as molecular sieves, zeolites, nickel and others may also be utilized. These purification materials are available from several sources such as SAES Getters S.p.A. of Lainate, Italy, Engelhard of Beachwood, Ohio, UOP of Sacramento, Calif.

Getter 222 is typically in the form of a porous metal pellet or metal powder. The pellet forms are typically a cylindrical shape with a diameter of 2 to 3 millimeters and a length of 3 to 5 millimeters. The pellets may also be other shapes and sizes. The powder forms are typically in the 0.010" grain size.

Getter 222 is typically Zr, Ti, Nb, Ta, V, and alloys thereof and mixtures with other materials. The getter 222 in the preferred embodiment is a pellet form of ST707™, ST198™, ST101™ and other getters manufactured by SAES Getters S.p.A. of Lainate, Italy. ST707™ is optimized for use in purifying the helium/noble gas family of gases and other gases. ST198™ is optimized for use in purifying nitrogen and other similar gases. Other gases may be purified utilizing other purification material types. In the preferred embodiment, the heated getter temperature will typically be between 200° C. and 400° C. Cooler and higher temperatures may also be utilized. Getter 222 operational temperature is dependent upon the specific getter type, gas type, impurity loading, gas flowrate and other variables.

The getter 222 is compressed into the inner volume 208 by a compression screen 224. The compression screen 224 is located in the inner volume 208, near the second end portion 218. The compression screen 224 provides constant pressure on the getter 222 such that the getter 222 does not substantially move or settle in the inner volume. If the getter 222 moves or settles, then gas flow may possibly bypass the getter and therefore not fully purify the gas. The compression screen 224 allows the integrated heated getter purifier system 200 to be utilized in a horizontal or vertical orientation. The compression screen 224 is preferably manufactured from 316L or 304L SST. Other materials such as other grades of steel and other metals can also be utilized.

A diverter 226 is also located in the inner volume 208. The diverter 226 has several purposes: First the diverter 226 separates and insulates the heated getter 245, which is located between the diverter 226 and the second end 218, from the cool getter 246, located between the diverter 226 and the first end portion 210. The diverter's 226 second purpose is to direct the gas flow from the heated getter 245 to the inner enclosure 204 wall, so as to transfer heat from the gas flow to the inner enclosure 204 wall. The diverter 226 can also operate to limit maximum gas flow rate through the integrated heated getter purifier system.

The specific longitudinal location of the diverter 226, within the inner volume 208, may vary depending on specific application variables including diverter 226 construction, purification material type, gas type and impurity loading, operating temperatures and other factors. The quantities of heated getter 245 and cool getter 246 on either side of the diverter 226 determines the longitudinal location of the diverter 226.

One purpose of the diverter 226 is to limit direct heat transfer from the heated getter zone to the cool getter zone. An example of this purpose is described by the following relationship:

$$Watt=(KA\Delta T)/L$$

where:
Watt=the heat in watts transferred through diverter 226
K=heat transfer constant for the material type
A=area exposed to heat, in this case, the area of the end of the diverter 226 exposed to the heated getter 245
ΔT=T1−T2
T1=temperature of heated getter 245
T2=temperature of cool getter 246
L=thickness of diverter 226

K is a constant determined by the diverter 226 material type and shape as will be discussed in detail below. ΔT is a constant determined by the process. For instance, if the heated getter 245 is a continuous 400° C. and the cool getter 246 is a continuous 20° C., then ΔT is a constant 380° C.

Since K and ΔT are constants, then A must be decreased and L increased as much as practicable.

A is determined by the shape of the diverter 226. As A decreases the heat transferred will decrease.

L is limited by the physical space of the inner volume 208 and the required quantity of purification material 222. As L increases the heat transferred through the diverter 226 will decrease.

Another purpose of the diverter 226 is as a portion of an efficient, integral, compact heat exchanger. The heat exchange occurs when the diverter 226 directs the hot gas flow from the heated getter 245 to the inner enclosure 204 wall so as to transfer heat from the gas flow to the inner enclosure 204 wall. The outside dimension of the diverter 226 is slightly smaller than the inside dimension of the inner enclosure 204. Gas flow around the diverter 226 will be in close proximity to the inner enclosure 204 wall. The heated gas flowing from the heated getter 245 transfers heat energy to the cooler inner enclosure 204 wall. The energy transferred from the heated gas flowing from the heated getter 245 to the inner enclosure 204 wall is further transferred to the cooler, inlet gas flowing through the annular volume 206.

FIGS. 7A through 7D illustrate various embodiments of the diverter 226. FIG. 7A illustrates a diverter 226A as a solid shape. The solid shape diverter 226A is a simple structure and therefore may be less expensive. Since diverter 226A is a solid, the effective area 227A of the material of the diverter 226A is the area of the end of the diverter 226A. Since diverter 226A is a solid, the heat transfer constant (K) of the material of the diverter 226A determines the heat transfer.

FIG. 7B illustrates a diverter 226B as a hollow shape with end caps. The heat transfer constant (K) of the space within diverter 226B substantially determines the thermal transfer performance in addition to the heat transfer constant (K) of the material of the diverter 226B. The effective area of the material of the diverter 226B is reduced to only a ring shaped area 227B. A hollow shape diverter 226B can be manufactured from materials with higher heat transfer constants such as stainless steel which reduces cost and increases durability.

FIG. 7C illustrates a diverter 226C as a bucket shape. A bucket shape diverter 226C provides additional volume which may be filled with getter material. Additional getter material provides additional capacity for impurities. A bucket shape also reduces the effective area of the diverter 226C to a filled ring shape 227C where the heat transfer (K) of the ring portion is determined by the material of the diverter 226C and the heat transfer (K) of the filled portion is determined by the purification material 222 which fills the bucket shape.

FIG. 7D illustrates a diverter 226D as a partially filled bucket shape with a supporting screen 236. A partially filled bucket shaped diverter 226D combines the advantages of the hollow diverter 226B and some additional capacity of a bucket shape diverter 226C. A partial bucket shape also reduces the effective area of the diverter 226D to a filled ring shape 227D where the heat transfer (K) of the ring portion is determined by the material of the diverter 226D and the heat transfer (K) of the filled portion is determined partially by the purification material 222 which fills the bucket shape and partially by the hollow space remaining within the bucket shape.

In the preferred embodiment, the diverter 226 is manufactured from 316L or 304L SST and is a hollow shape having end caps as illustrated in FIG. 7B. Other materials may also be utilized. The diverter 226 may be manufactured by General Electric and other manufacturers of similar type products for various high temperature applications. Alternatively, other materials such as ceramics, glass or silicon compounds and other low heat transfer type materials may be utilized.

The diverter 226 may be manufactured in many other shapes also, as may be required to meet the requirements of the specific application.

FIG. 7E illustrates a diverter 226E with extensions 238. The diverter 226E may be any of the previous shapes of diverters 226 discussed above. A solid shape diverter similar to that shown in FIG. 7A is illustrated for clarity. The diverter 226 must be properly located within the inner volume 208 to properly direct gas flow for heat transfer to the inner enclosure 204 wall. The extensions 238 illustrated on diverter 226E determine the location of the diverter 226E within the inner enclosure 208. The extensions 238 may also be formed on the inner enclosure 204 wall. The extensions 238 may be in many shapes such as small blocks or rounded "bumps" or other shapes. The extensions are preferably, evenly spaced around the outer circumference of the diverter 226E such that the diverter 226E is centered in the inner enclosure 204.

The extensions 238 may also be in the form of a "full skirt" around the diverter 226E. If the extension 238 is a fill skirt design, additional passages 240 through the diverter 226E, are required for gas flow and provide an advantage of directing gas flow toward the center of the cooler getter 246 which may provide better utilization of the cooler getter 246 over other diverter 226 shapes.

Referring to the particle filter 244 in FIG. 6, the filter 244 is located in the inner volume 208, separating the getter material 222 from the outlet 212 of the heated getter purifier system 200. The filter 244 removes particles from the gas flowing from the purifier. The filter 244 may be manufactured from several materials such as Teflon or sintered metal or other commercially available filter media. The filter 244 in this example is sintered stainless steel. Sintered stainless steel is typically guaranteed by the manufacturers' to filter at the rated performance for five years. Other types of filter media are typically not guaranteed for as long. Manufacturers such as Pall Filters, of Farmington, Conn., or Mott Filters, also of Farmington, Conn., and others, offer suitable filters.

A plurality of filter 244 performance designs may be utilized. In the preferred embodiment, the filter 244 is rated to remove substantially all particles 10 micron and larger. More precise filtering may also be utilized to remove substantially all particles larger than 0.003 micron.

Figure 8B:
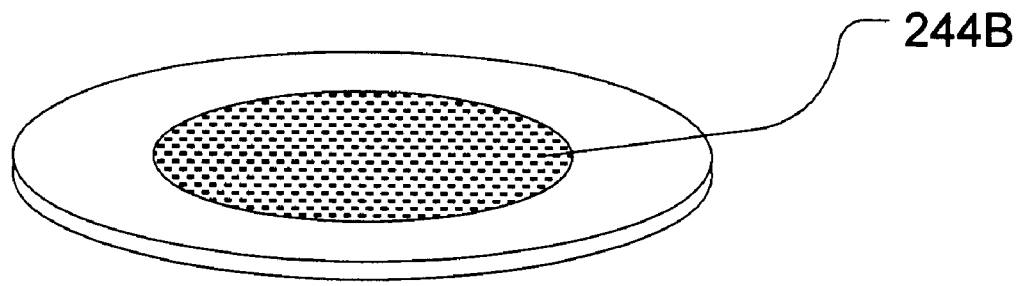
FIGS. 8A and 8B illustrate two filter types for the embodiment illustrated in FIG. 6.
Figure 8A:
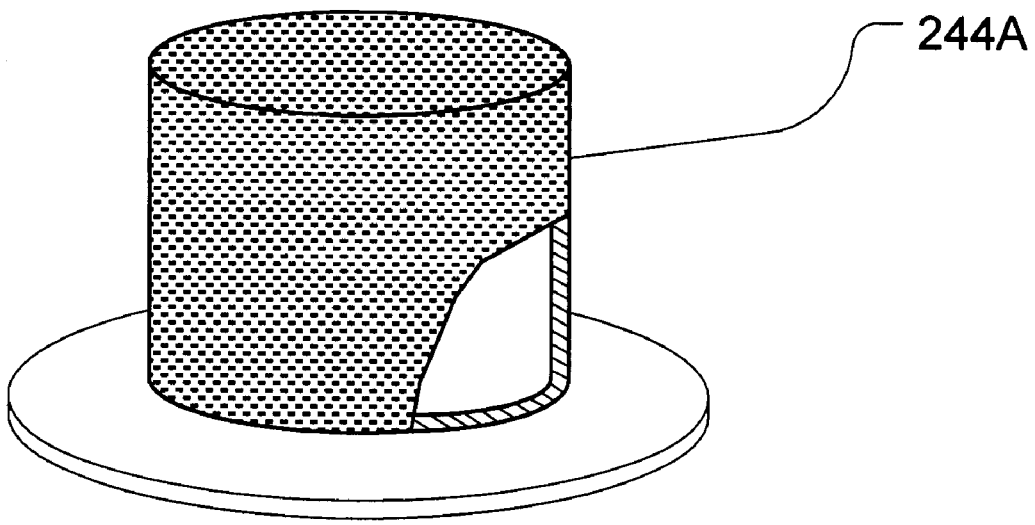

FIG. 8A illustrates details of a "top hat" style filter 244A. FIG. 8B illustrates a "disk" style filter 244B. Other filter styles which are not illustrated may also be utilized. The filter 244A, 244B is preferably welded in place by welding around the solid edge or "hat brim." The filter 244 may be installed on the first end 210 as illustrated in FIG. 8, or installed in the inner enclosure away from the first end 210.

The integrated heated getter purifier system 200 is preferably monitored with a temperature control system to control the temperature of the heated getter 245. The heated getter 245 should be at the or near the desired temperature for the best performance. There are several methods to control the temperature.

A first embodiment to controlling the temperature is through utilizing an external controller which is also utilized for the modular gas stick. Modular gas sticks require a controller to control and operate the gas stick components such as valves, mass flow controllers, and other active components. A thermocouple monitors temperature of the heated getter 245 and provides a feedback source to the controller. The thermocouple may be integral to the heater 220 or installed elsewhere in or on the surface of the heated getter purifier system 200.

An alternative method for controlling the heater 220 temperature is through utilizing a self temperature limiting heater 220. Such a heater 220 has an integral temperature switch. The integral temperature switch or equivalent electrical circuit stops the current flow to the heater 220 when the heater 220 reaches a set temperature.

Another method for controlling the heater 220 temperature is through an external controller which precisely controls the voltage and current source for the heater. As the temperature of the heater 220 increases, the resistive heater resistance increases. When the resistance of the heater 220 reaches a set resistance, the current is interrupted by the controller.

Another method for controlling the heater 220 temperature is an equilibrium method which requires a precisely regulated voltage and current source. The heater 220 is continuously powered. The gas flow through the purifier continuously cools the heater 220 and heated getter 245. The power rating of the heater 220 is such that the continuous heating and cooling of the gas flow achieves a state of temperature equilibrium. For example, if calculations and testing reveal that a temperature equilibrium state will be achieved with 100 watts of heat, then a 100 watt heater is utilized and the current and voltage to the heater are precisely regulated so the heater produces a relatively constant 100 watts.

Figure 9:
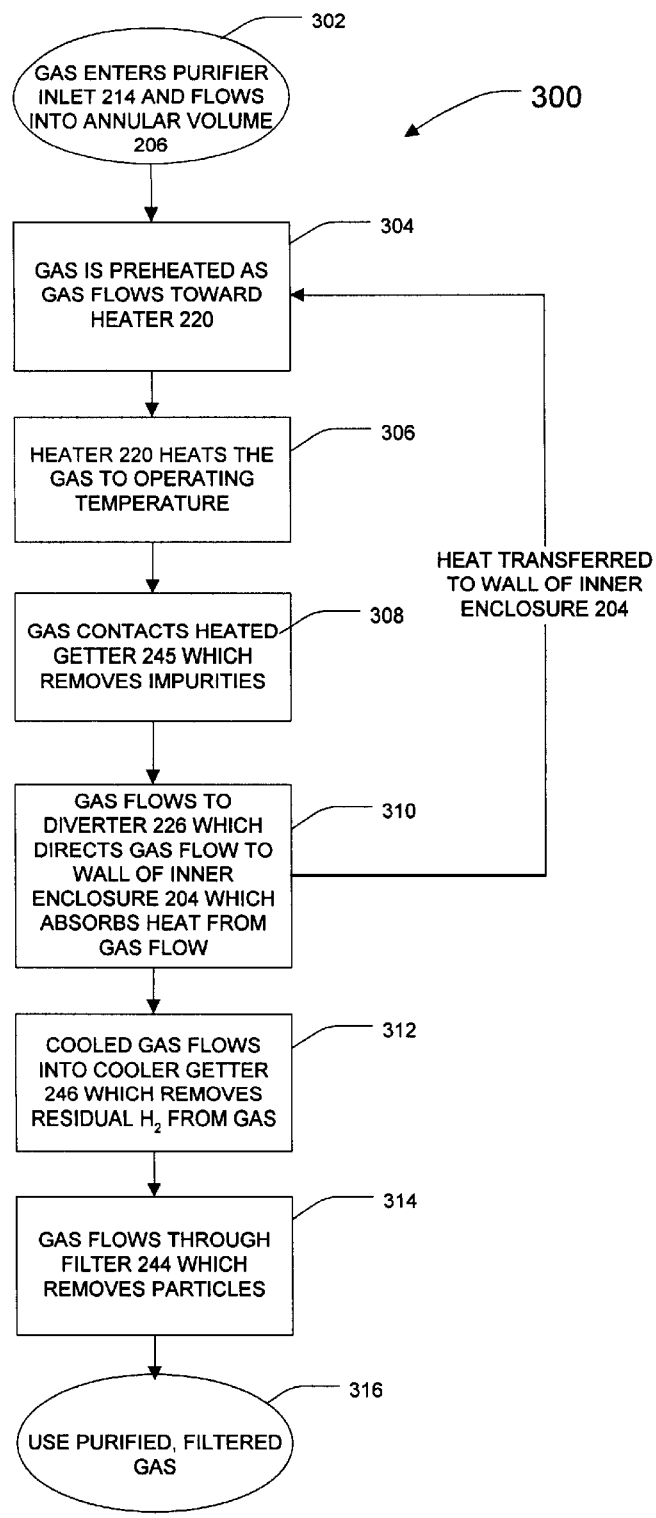
FIG. 9 is a process flowchart of a heated getter purifier process in accordance with the present invention.

FIG. 9 is a flowchart 300 illustrating an integrated heated getter purification method of the present invention. In an operation 302, gas flows into the inlet 214 of the integrated heated getter purifier system 200 and into the annular volume 206 toward the heater 220.

Next, the gas flow is preheated in an operation 304. The gas is preheated as the gas flows past a heated area of the inner enclosure 204 wall, toward the heater 220.

Then, in an operation 306, gas flows past the heater 220 and is heated to the proper operating temperature. The heater 220 heats the gas flow and the heated getter 245 to the proper operating temperature. In this example, the heated purification material temperature will typically be between 200° C. and 400° C. Cooler and higher temperatures may also be utilized. Heated getter 245 operational temperature is dependent upon the specific heated getter 245 type, gas type, impurity loading, gas flowrate and other variables.

Next, in an operation 308, the impurities such as $CO_2$, $H_2O$, $CH_4$, CO, $O_2$ and $N_2$ are substantially removed from the heated gas flow. The impurities are sorbed by the heated getter 245.

From the heated getter 245, the gas flow is cooled from operating temperature to the desired outlet temperature. The gas flow is cooled by flowing around the diverter 226 in an operation 310. The diverter 226 directs gas flow toward the wall of the inner enclosure 204 where the heated gas dissipates a portion of the heat to the wall of the inner enclosure 204. The heated inner enclosure wall preheats the gas flowing in the annular volume 206 as described in operation 304 above.

A next operation 312, the cooled gas flows into a second volume of unheated, cooler getter 246, located in the inner volume, between the diverter 226 and the filter 244. The cooler getter 246 substantially removes residual $H_2$ from the gas flow.

In a next operation 314, the purified gas flows to the filter 244. The filter 244 substantially removes particles from the gas flow. The filter 244 may be rated to remove particles as small as 0.003 micron. The purified gas is then used for the intended purpose in an operation 316.

An integrated heated getter purifier system is intended for use with any modular interface type application such as any of the modular gas stick systems. Other uses include, without limitation the following examples: stand alone, direct installations on an end use instrument, or a semiconductor process tool, or a gas mixing manifold, or a gas distribution manifold. Other applications requiring a modular interface, compact form factor, high purity performance.

A modular gas stick and many of the other applications identified above are a portion of the processing of semiconductors in the manufacture of integrated circuit devices. Other industries that may also utilize an integrated heated getter purifier system include medical industries, chemical analysis, chemical processing and manufacture, food processing and testing, pharmaceutical manufacture, petrochemical manufacture and distribution and others.

Although only a few embodiments of the present invention have been described in detail herein, it should be understood that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

What is claimed is:

1. A method for purifying gas comprising:
   flowing gas into an inlet at a first end of a purification unit;
   heating said gas;
   contacting said gas with a purification material; and
   flowing said gas from an outlet at said first end of said purification unit.

2. A method as recited in claim 1 further comprising preheating the gas before contacting the gas with said purification material.

3. A method as recited in claim 1 wherein said purification material is a getter material including a metal selected from the group consisting of Zr, Ti, Nb, Ta, V, and alloys thereof.

4. A method as recited in claim 3 further comprising preheating the gas before the gas contacts said purification material.

5. A method as recited in claim 4 further comprising cooling the gas before the gas flows from said outlet.

6. A method as recited in claim 5 further comprising filtering the gas before the gas flows from said outlet.

7. A method for preheating gas comprising:
   flowing gas into an inlet at a first end of a heat exchanger unit;
   contacting said gas with a first side of a first heated surface;
   contacting said gas with a second heated surface;
   diverting said gas so as to cause gas to contact a second side of the first heated surface; and
   flowing said gas from an outlet at said first end of said heat exchanger unit;
   whereby said heated gas transfers heat to said second side of said first heated surface.

8. A gas purifier comprising:
   an outer enclosure having a first end and a second end;
   an inner enclosure disposed within said outer enclosure such that an annular volume is defined between said inner enclosure and said outer enclosure, said inner enclosure defining an inner volume;
   a quantity of purification material disposed within said inner volume of said inner enclosure;
   a heater for heating a region of said purifier near said second end; and
   an inlet and an outlet, both proximate to said first end of said outer enclosure, said inlet communicating with said annular volume and said outlet communicating with said inner volume;
   whereby a gas containing an impurity may enter said gas purifier via said inlet, flow through said annular volume to said inner volume, flow through a first zone and a second zone of said gas purification material, said second zone being cooler than said first zone, then exit said gas purifier via said outlet, said gas purification material operable to trap at least some of the impurity from the gas.

9. A gas purifier as recited in claim 8 wherein said heater is in contact with at least some portion of said second region of the purifier including the second end and a portion of the outer enclosure near the second end.

10. A gas purifier as recited in claim 9 further comprising a diverter disposed within said inner volume between said first end of said outer enclosure and said heater.

11. A gas purifier as recited in claim 10 wherein said diverter includes a ceramic material.

12. A gas purifier as recited in claim 8 wherein said heater is in contact with at least some of said purification material in said first zone.

13. A gas purifier as recited in claim 8 wherein said purification material is a getter material comprising a metal selected from the group consisting of Zr, Ti, Nb, Ta, V, and alloys thereof.

14. A gas purifier as recited in claim 13, wherein the heater is in contact with at least some of said purification material.

15. A gas purifier as recited in claim 14 further comprising a diverter disposed within said inner volume between said first end of said outer enclosure and said heater.

16. A gas purifier as recited in claim 15 wherein said diverter includes a ceramic material.

17. A gas purifier as recited in claim 13 further comprising a filter disposed in said inner volume, proximate to said outlet.

18. A gas purifier as recited in claim 17 wherein said filter includes sintered stainless steel.

19. A gas purifier as recited in claim 17 wherein said filter is capable of removing substantially all particles as small as 0.003 micron.

20. A gas purifier as recited in claim 13 further comprising a modular gas stick interface at said first end.

21. A gas purifier as recited in claim 8 further comprising a filter disposed in said inner volume, proximate to said outlet.

22. A gas purifier as recited in claim 21 wherein said filter includes sintered stainless steel.

23. A gas purifier as recited in claim 21 wherein said filter is capable of removing substantially all particles as small as 0.003 micron.

24. A gas purifier as recited in claim 8 further comprising a modular gas stick interface at said first end.

25. A gas purifier as recited in claim 24 wherein said modular gas stick interface communicates with modular gas stick substrate.

26. A heat exchanger comprising:

an elongated outer enclosure having a first end and a second end;

an elongated inner enclosure disposed within said outer enclosure such that an annular volume is defined between said inner enclosure and said outer enclosure, said elongated inner enclosure defining an inner volume;

a heater for heating said heat exchanger, said heater in contact with at least some portion of a second end region of the heat exchanger including the second end and a portion of the outer enclosure near the second end;

a diverter disposed within said inner volume between said first end of said outer enclosure and said second end; and an inlet and an outlet, both proximate to said first end of said outer enclosure, said inlet communicating with said annular volume and said outlet communicating with said inner volume;

whereby a gas may enter said heat exchanger via said inlet, flow through said annular volume past said second end region into said inner volume, around said diverter disposed within said inner volume, then exit said heat exchanger via said outlet, said second end region operable to heat said gas, said diverter operable to direct said heated gas toward said inner enclosure wall, said inner enclosure wall operable to transfer at least some heat present in said gas to said gas flow in said annular volume.

* * * * *